US012705692B2

(12) United States Patent
Khoreva et al.

(10) Patent No.: US 12,705,692 B2
(45) Date of Patent: Aug. 11, 2026

(54) TRAINING OF A MACHINE LEARNING SYSTEM FOR OBJECT-LEVEL IMAGE SYNTHESIS WITH LABELED-SLOT CONDITIONING

(71) Applicant: Robert Bosch GmbH, Stuttgart (DE)

(72) Inventors: Anna Khoreva, Stuttgart (DE); Massimo Bini, Tübingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 292 days.

(21) Appl. No.: 18/501,253

(22) Filed: Nov. 3, 2023

(65) Prior Publication Data

US 2024/0161234 A1 May 16, 2024

(30) Foreign Application Priority Data

Nov. 15, 2022 (DE) ..................... 10 2022 212 154.6

(51) Int. Cl.
*G06T 3/4046* (2024.01)

(52) U.S. Cl.
CPC .................................. *G06T 3/4046* (2013.01)

(58) Field of Classification Search
None
See application file for complete search history.

(56) References Cited

PUBLICATIONS

Razavi et al (Generating Diverse High-Fidelity Images with VQ-VAE-2, Jun. 2, 2019).*

Chen et al (CrossViT: Cross-Attention Multi-Scale Vision Transformer for Image Classification, Aug. 22, 2021).*

Chang et al (MaskGIT: Masked Generative Image Transformer, Feb. 8, 2022).*

Singh et al (Illiterate DALL-E Leans to Compose, Mar. 14, 2022).*

Locatello et al (Object-Centric Learning with Slot Attention, Oct. 14, 2020).*

Esser et al., “Taming Transformers for High-Resolution Image Synthesis,” 2021 IEEE/CVF Conference on Computer Vision and Pattern Recognition (CVPR), 2021, pp. 12868-12877.

Chang et al., “Maskgit: Masked Generative Image Transformer,” Conference on Computer Vision and Pattern Recognition, 2022, pp. 11315-11325. <https://openaccess.thecvf.com/content/CVPR2022/papers/Chang_MaskGIT_Masked_Generative_Image_Transformer_CVPR_2022_paper.pdf> Downloaded Nov. 2, 2023.

Ramesh et al., “Zero-Shot Text-to-Image Generation,” Proceedings of the 37 Th International Conference on Machine Learning, Online, PMLR 139, 2020, pp. 1-11. <https://proceedings.mlr.press/v139/ramesh21a/ramesh21a.pdf> Downloaded Nov. 2, 2023.

Locatello et al., “Object-Centric Learning With Slot Attention,” 34th Conference on Neural Information Processing Systems (NEURRPS 2020), 2020, pp. 1-14.

Singh et al., “Illiterate Dall-E Learns to Compose,” International Conference on Learning Representations, 2022, pp. 1-46. <https://openreview.net/pdf?id=h0OYV0We3oh> Downloaded Nov. 2, 2023.

* cited by examiner

*Primary Examiner* — Fan Zhang
(74) *Attorney, Agent, or Firm* — NORTON ROSE FULBRIGHT US LLP

(57) ABSTRACT

A computer-implemented method for training a machine learning system. The machine learning system is trained for generating images in at least two stages.

10 Claims, 8 Drawing Sheets

TRAINING OF A MACHINE LEARNING SYSTEM FOR OBJECT-LEVEL IMAGE SYNTHESIS WITH LABELED-SLOT CONDITIONING

CROSS REFERENCE

The present application claims the benefit under 35 U.S.C. § 119 of German Patent Application No. DE 10 2022 212 154.6 filed on Nov. 15, 2022, which is expressly incorporated herein by reference in its entirety.

BACKGROUND INFORMATION

Image synthesis is the process of artificially generating images that contain some particular desired content. It is analogous to the inverse of the classification problem: generating an image that contains the visual contents that are associated with a specific label. Generative adversarial networks (GANs) are an architecture that can be trained to generate synthetic images.

For example, vector quantized, VQ, models make use of transformer architectures in an effective way by using them at an image embedding level rather than at pixel level.

The VQ model VQGAN has been one of the first VQ models to reach high resolution image generation capabilities, see for example Patrick Esser, Robin Rombach, and Björn Ommer; "Taming transformers for high-resolution image synthesis;" in CVPR, 2021.

In particular, during training a codebook of token embeddings is learned in a first stage that will work as a dictionary for the transformer in a second stage. In this way, at inference time, new images can be synthesized by sampling a sequence of token embeddings from the codebook, and decoding them into images. In VQGAN, initially this was done autoregressively, making the generation slow and introducing unwanted biases. However, recently, MaskGIT showed a better and faster solution via a bidirectional masking approach, see for example Chang, H., Zhang, H., Jiang, L., Liu, C., Freeman, W. T.; "MaskGIT: Masked generative image transformer;" arXiv preprint arXiv: 2202.04200, 2022. In this regard, conditional generation is done by appending conditioning tokens to the image ones, making the transformer learn the conditional data distributions. For example, in DALL-E, Aditya Ramesh, Mikhail Pavlov, Gabriel Goh, Scott Gray, Chelsea Voss, Alec Radford, Mark Chen, and Ilya Sutskever; "Zero-shot text-to-image generation;" in Marina Meila and Tong Zhang, editors, ICML, 2021, one could see some sort of controllability via text conditioning; however, it is not always straightforward and controllable at an object level.

In an attempt to get object-centric representations, Locatello et al., Francesco Locatello, Dirk Weissenborn, Thomas Unterthiner, Aravindh Mahendran, Georg Heigold, Jakob Uszkoreit, Alexey Dosovitskiy, and Thomas Kipf; "Object-centric learning with slot attention;" 2020, introduced the concept of slots: sorts of memory cells to which the model can attend to through slot attention and that end up binding to an object over multiple rounds of attentions. In this regard, Slot2Seq, Gautam Singh, Fei Deng, Sungjin Ahn; "Illiterate DALL-E Learns to Compose;" 2021, combines DALL-E with slot attention in order to synthesize new images in a compositional manner, by conditioning on concepts learned during training via the slots. However, such conditioning is not easily controllable, since slots concepts are manually inferred, and the model drastically hinders DALL-E capabilities by removing its text-conditioning structure.

The present invention improves upon approaches described in the related art.

SUMMARY

An example embodiment of the present invention refers to a computer-implemented method for training a machine learning system, the machine learning system being trained for generating images in at least two stages, wherein in a first stage based on at least one input image at least one codebook is learned by tokenizing the at least one input image and reconstructing images through an autoencoding architecture, and in a second stage a transformer decoder is trained to generate images based on the at least one codebook by reconstructing masked tokens of the reconstructed images, wherein generating the codebook dictionary in the first stage comprises generating codebook vocabulary by mixing image features of the input image among different scales of the image features, the image features being encoded and decoded via the autoencoding architecture, and wherein the transformer decoder is trained to generate images based on labeled-slot conditioning.

According to an example embodiment of the present invention, in the first stage, a codebook dictionary is learned by tokenizing an input image, i.e. encoding the input image into a finite set of tokens, and reconstructing images through an autoencoding architecture. In practice, the input image is encoded into a lower dimensional space, and is then quantized, i.e. each embedding vector is substituted with the nearest vector from a codebook dictionary. Then, images are reconstructed via a decoder. For training of the autoencoding architecture and the codebook for example a perceptual loss and/or a reconstruction loss, and/or a GAN loss, where a discriminator tries to discriminate between real and reconstructed images, can be used.

According to an example embodiment of the present invention, in the second stage, a transformer decoder is trained to reconstruct the masked tokens of the embedded images. According to an example, a bidirectional transformer is trained to reconstruct a randomly picked percentage of randomly masked tokens. In this way, during inference, the transformer is able to generate new embedded images by sampling a certain number of tokens at each step, for example by following a specific schedule, which are then decoded into new images. Such a bidirectional transformer is for example from MaskGIT.

According to the present invention, an improvement of the first step and an improvement of the second stage is provided.

In the proposed model according to an example embodiment of the present invention, for generating the codebook dictionary in the first stage a cross-scale mixing among different scales of image features, that are being encoded and decoded back, is suggested.

According to an example embodiment of the present invention, for the second stage, a slot-based conditional generation is provided. By doing so, a new way to employ multi-class conditioning for VQ generative models is introduced. The proposed object-level conditioning enables easier compositional generation. The inclusion of class labels facilitates the binding of captured concepts to specific classes, making it easier to compose images from the basic unit of objects. In practice, this new structure allows for object-controllable compositional image generation, wherein new objects can be added, and ones that are present can be removed or substituted with objects of different classes. Labeled-slots conditioning is also advantageous as it is human-readable and controllable, while with respect to the latter, the proposed model is extremely simpler and straightforward, building upon an architecture that is comparable with current state of the art for image synthesis. This also implies an easier annotation task during data collection, since annotators just need to select if some objects are present or not from a list of pre-defined objects.

The provided method according to the present invention is a modification of the above mentioned MaskGIT architecture. Mixing across scales is considerably eased, thereby improving the model capability of generating a richer vocabulary of reusable concepts. This is important for compositionality, since capturing shared concepts of higher quality among data, here represented by codebook vectors, means being better at generalizing. Combination of concepts in unseen ways would bring less biases coming from the training data along with them. The MaskGIT architecture itself consists basically in an improvement over the second stage of VQGAN.

According to an example embodiment of the present invention, the input image comprises low-level image features and high-level images features, and cross-scale mixing comprises aggregating high-level image features and low-level images features together via at least one cross-attention module among low-level image features and high-level image features. In practice, this is done for example by adding cross-attention modules among image features at different scales, i.e., aggregating high and low-level features together.

According to an example embodiment of the present invention, the cross-scale mixing comprises at least one tokenization and reconstruction process at a first level of the autoencoding architecture and at least one tokenization and reconstruction process at a second level of the autoencoding architecture, and updating the first level of the autoencoding architecture with losses coming from the second level the autoencoding architecture and/or updating the second level of the autoencoding architecture with losses coming from the first level the autoencoding architecture.

According to an example embodiment of the present invention, in the first stage at least one of the following codebook configuration is generated: a) at least two separate scale-related codebook dictionaries; or b) a low-level codebook and a high-level codebook, wherein the low-level codebook is dependent on the high-level codebook, or c) to a single scale-mixed codebook.

According to configuration a), namely at least two separate scale-related codebook dictionaries, images can be generated attending to both of codebook dictionaries. According to configuration c), a single scale-mixed codebook leaves more freedom to the model. These cross-scale codebooks encourage interactions among different features at different scales, leading to richer codebook vectors. This is important since a better codebook is more prone to get reusable concepts, which will lead to less biases coming from the dataset and better compositional capabilities.

According to an example embodiment of the present invention, labeled-slot conditioning comprises providing a plurality of class labels, wherein each class label corresponds to a class of an object of an image, to slots of a slot attention module of the transformer decoder. In particular, the number of the class labels and the number of the slots per image will be equal to the number of objects of the image plus one for the background.

According to an example embodiment of the present invention, the method comprises initializing the slots of the slot attention module in a class-dependent way, and providing a loss term that enforces a respective slot to be associated to a specific class. In order to enforce such a slot-conditioning a classifier is used over the image token embeddings and such prediction are compared with slot class labels. A classifier associates each image embedding vector to a class, and then each slot attention map is used as weighted average terms to get the corresponding slot class, while a loss term enforces it to be of the correct class.

According to an example embodiment of the present invention, wherein if at least two hierarchical codebook dictionaries related to different scales are obtained in stage 1, the slot attention module can be modified according to one of the following: (i) mixing the at least two codebook dictionaries by concatenating vectors of the at least two codebook dictionaries, (ii) nesting the cross attentions before the at least one gated recurrent unit, GRU, of the transformer decoder, (iii) concatenating at least two separate slot attention modules.

Further example embodiments of the present invention refer to a machine learning system trained according to a method according to the example embodiments.

Further example embodiments of the present invention refer to the use of a trained machine learning, wherein the machine learning system being trained to a method according to the embodiments for at least one of the following a) generating labeled objects and/or b) composing image data for augmented and/or synthetic data and/or c) generating image data for synthetic data in unseen compositions. The trained model provides a low-priced and efficient solution for generating new data also in unseen compositions, which may be expensive or extremely hard to get in the wild. In addition, the flexibility of the model makes it extremely versatile for generating a diverse and rich set of synthetic data.

Further embodiments of the present invention refer to the a method using of a machine learning, wherein the machine learning system for generating at least one training data set and/or at least one test data set. The at least one training data set or the at least one test data set comprising labeled object data and/or labeled image data. The at least one training data set or the at least one test data set is used to train and/or to test a machine learning system. The generated labeled object data and/or generated labeled image data is used for image analysis. Advantageously, the use of the generated labeled object data and/or generated labeled image data for image analysis allows to use augmented and/or synthetic data and/or image data of synthetic data in unseen compositions in image analysis.

Further embodiments of the present invention are derived from the following description and the figures.

DETAILED DESCRIPTION OF EXAMPLE EMBODIMENTS

Figure 1:
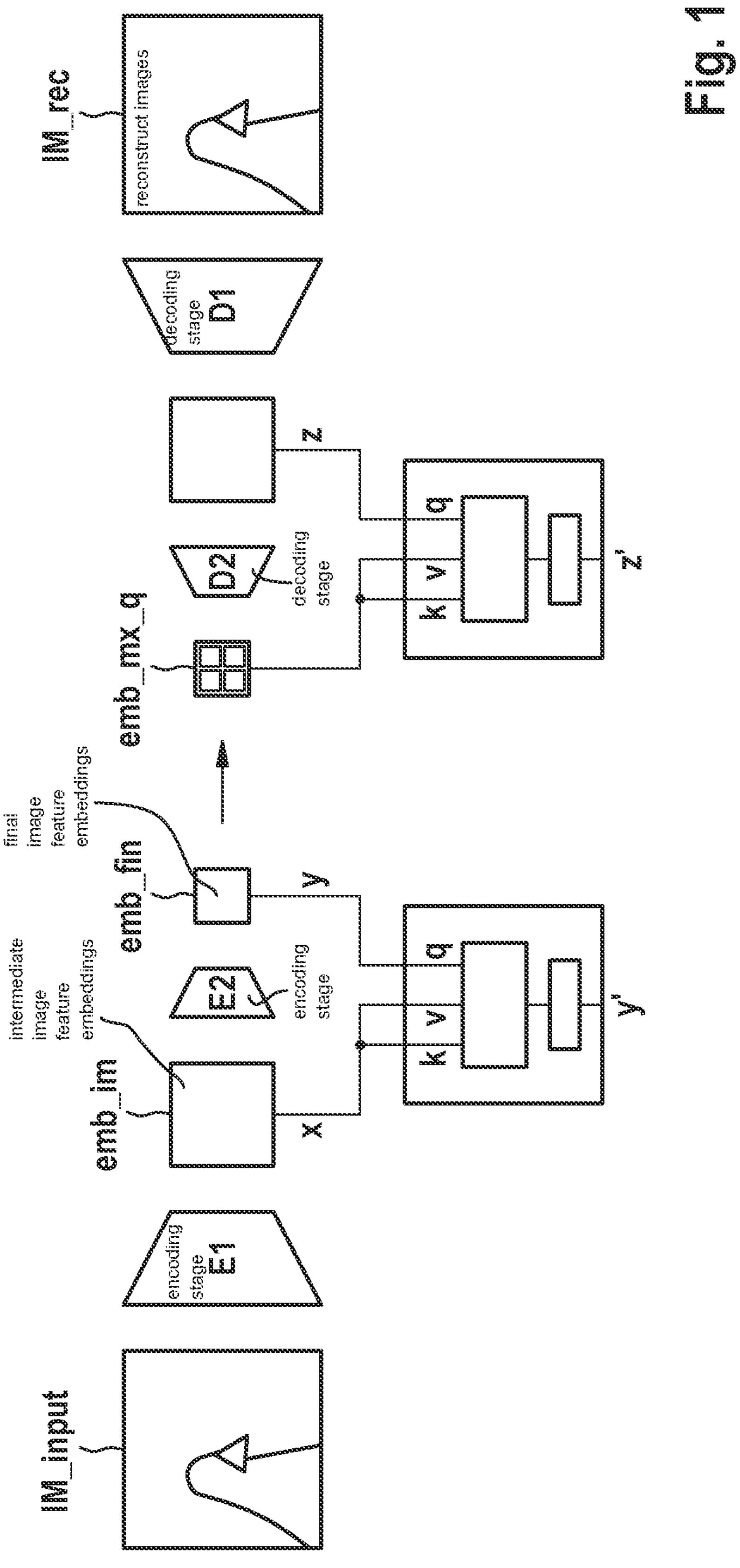
FIG. 1 schematically depicts an autoencoding structure of a first stage according to an example embodiment of the present invention.

FIG. 1 depicts a first stage of a method for training a machine learning system according to a first example. In the first stage, a codebook dictionary is learned by tokenizing an input image IM_input, i.e. encoding the input image IM_input into a finite set of tokens, and reconstructing images through an autoencoding architecture.

According to the example, the autoencoding structure comprises two encoding stages E1, E2 and two decoding stages D1, D2. In the first stage, a codebook dictionary is learned by tokenizing, i.e. encoding into a finite set of tokens, and reconstructing images IM_rec through an autoencoding architecture.

In practice, an input image IM_input is encoded into a lower dimensional space. According to an example, the input image IM_input comprises an initial dimension of e.g. 256×256×3, and is encoded into a dimensional space of e.g. 16×16×'embed_dim'.

According to the example, the input image IM_input is encoded via encoding stage E1 into a so called intermediate image feature embeddings emb_im. From the intermediate image feature embeddings, low level features x can be derived.

According to the example, the image is further encoded via encoding stage E2 into final image feature embeddings emb_fin. From the final image feature embedding emb_fin, high level features y can be derived.

According to the example, via a cross-attention module high-level image features and low-level images features are aggregated together for cross-scale mixing among low-level image features and high-level image features. The mixed features embeddings emb_mx are represented by y'. In the figures, the letters k, v and q stand for keys, values and query of the attention mechanism.

The mixed features embeddings emb_mx are then quantized, i.e. each embedding vector is substituted with the nearest vector from a codebook dictionary. Then the quantized version of y', emb_mx q is decoded via the first decoder stage D1 and a second decoder stage D2 to obtain a reconstruction IM_rec of the input image IM_input.

According to the example, a further cross-attention module is added on the decoder side.

Figure 2:
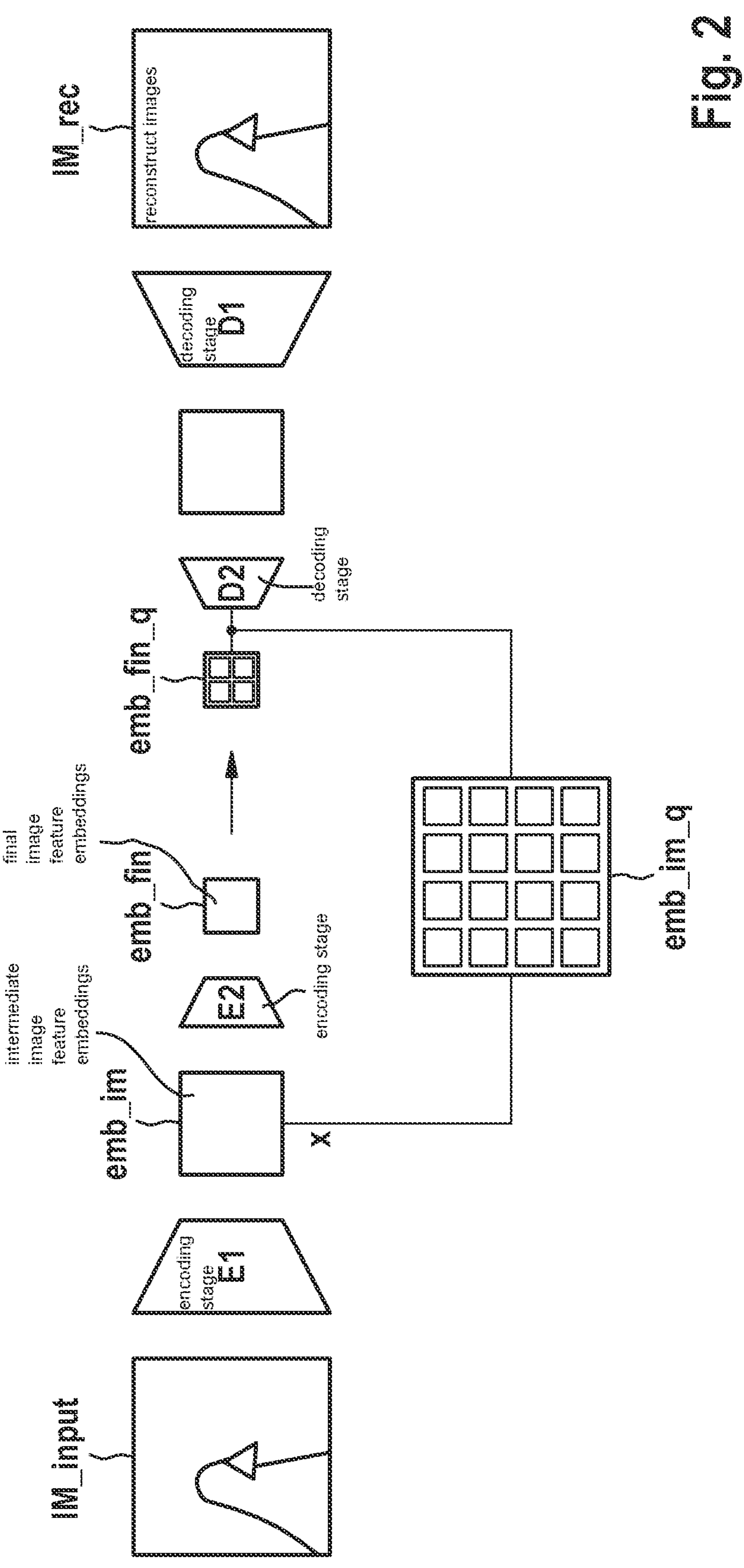
FIG. 2 schematically depicts an autoencoding structure of a first stage according to a further example embodiment of the present invention.
Figure 3:
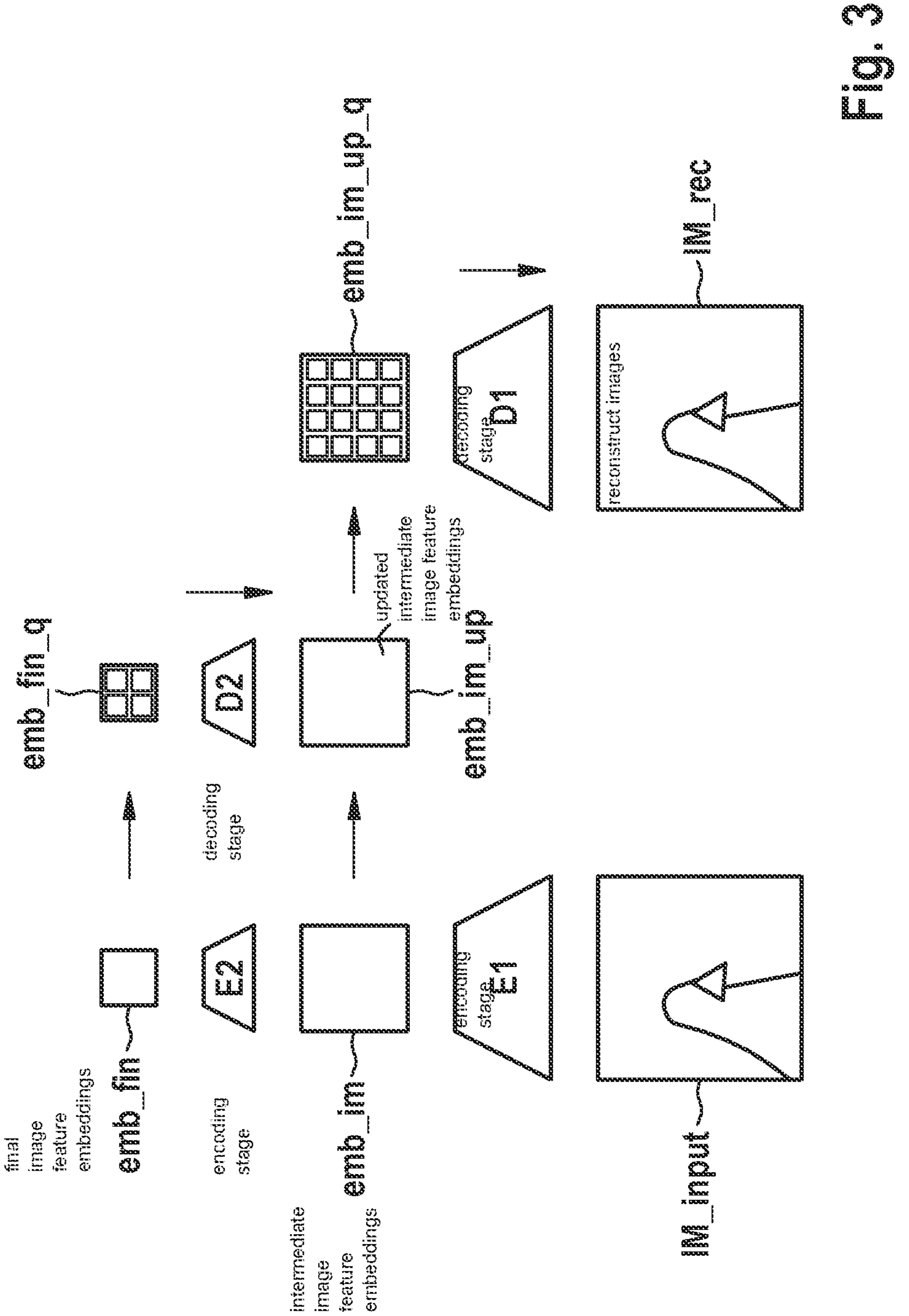
FIG. 3 schematically depicts an autoencoding structure of a first stage according to a further example embodiment of the present invention.

FIGS. 2 and 3 depict a first stage of a method for training a machine learning system according to a second and a third example. According to the examples a plurality of tokenization and reconstruction processes are created at different scales of the architecture, and different parts of the architecture are updated with losses coming from different scales.

According to the example depicted in FIG. 2, both a quantized version of the intermediate image feature embeddings emb_im_q and a quantized version of the final image feature embeddings emb_fin_q are used to update the second decoder stage D2.

According to the example depicted in FIG. 3, first, a quantized version of the final image feature embeddings emb_fin_q is used to update the second decoder stage D2 and the intermediate image features embeddings into to derive emb_im_up. Then a quantized version of the updated intermediate image feature embeddings emb_im_up_q is used to update the first decoder stage D1.

These new tokens derived in the examples according to FIG. 1 to FIG. 3 in the first stage can lead for example to one of the following codebook configuration: a) at least two separate scale-related codebook dictionaries; or b) a low-level codebook and a high-level codebook, wherein the low-level codebook is dependent on the high-level codebook, or c) to a single scale-mixed codebook When generating at least two separate scale-related codebook dictionaries, images may generated attending to both of them.

These cross-scale codebooks encourage interactions among different features at different scales, leading to richer codebook vectors. This is important since a better codebook is more prone to get reusable concepts, which will lead to less biases coming from the dataset and better compositional capabilities.

Figure 4:
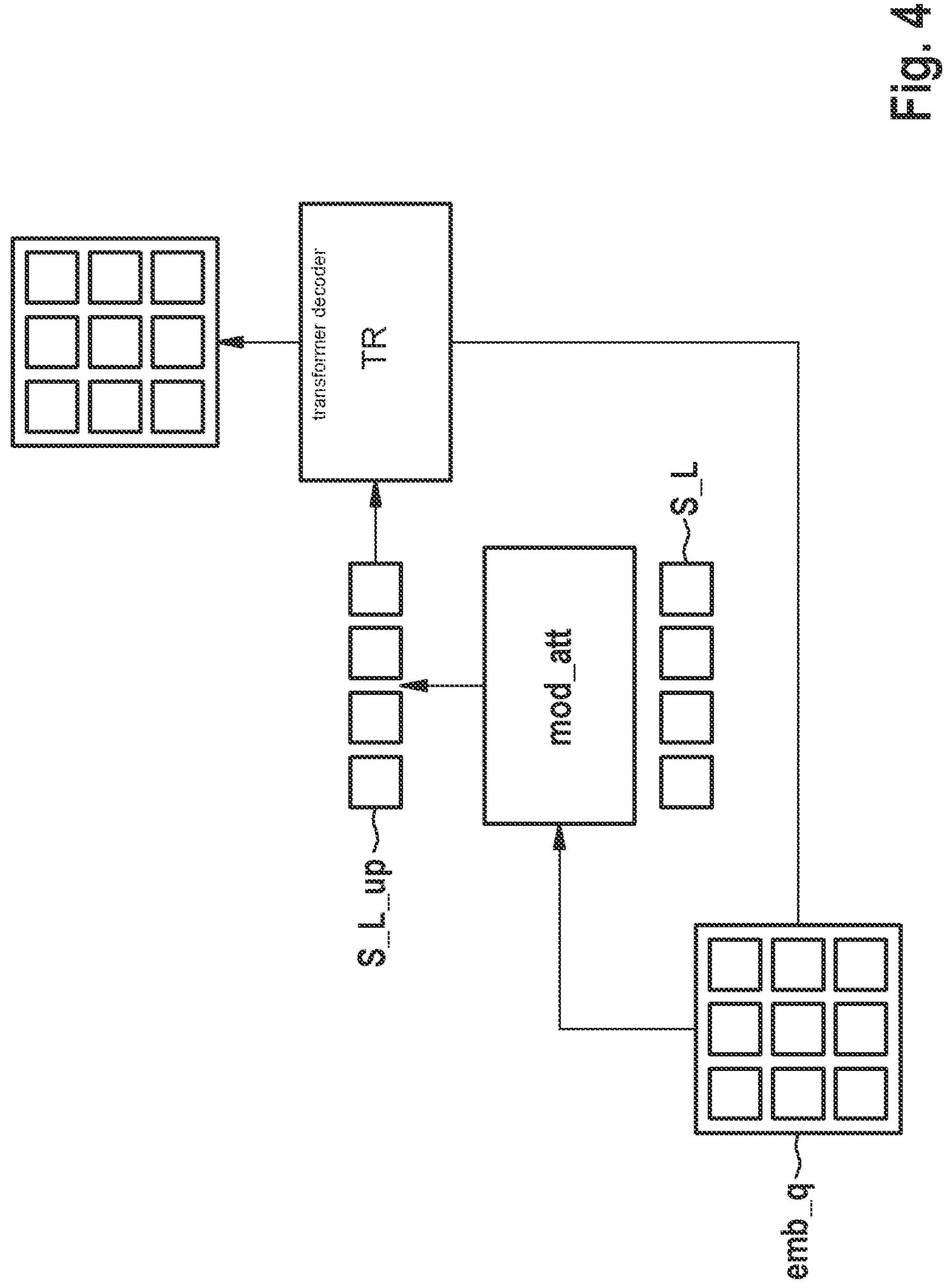
FIG. 4 schematically depicts a transformer decoder structure of a second stage according to an example embodiment of the present invention.

FIG. 4 depicts a second stage of a method for training a machine learning system according to an example. In the second stage, a transformer decoder TR is trained to generate new images taking into account the codebook dictionary or the codebook dictionaries generated in stage 1. In this way, at inference time, new images can be synthesized by sampling a sequence of token embeddings from the codebook, and decoding them into images.

According to the present invention, the transformer decoder TR is trained to generate images based on labeled-slot conditioning.

Slots have been introduced by Locatello et al., Francesco Locatello, Dirk Weissenborn, Thomas Unterthiner, Aravindh Mahendran, Georg Heigold, Jakob Uszkoreit, Alexey Dosovitskiy, and Thomas Kipf; "Object-centric learning with slot attention;" 2020. Slots are basically representations that are used as memory cells by the model. For introducing and updating these representations, a slot attention module can be used. After some round of attention, the representations will end up binding in attention terms to different objects of the image scene.

Labeled-slot conditioning comprises providing a plurality of class labels, wherein each class label corresponds to a class of an object of an image, to slots of a slot attention module of the transformer decoder. In particular, the number of the class labels and the number of the slots per image will be equal to the number of objects of the image plus one for the background.

According to an embodiment, the method comprises initializing the slots S_L of the slot attention module in a class-dependent way, and providing a loss term that enforces a respective slot to be associated to a specific class. In order to enforce such a slot-conditioning a classifier may be used over the image token embeddings and such prediction are compared with slot class labels. A classifier associates each image embedding vector to a class, and then each slot attention map is used as weighted average terms to get the corresponding slot class, while a loss term enforces it to be of the correct class.

Figure 5:
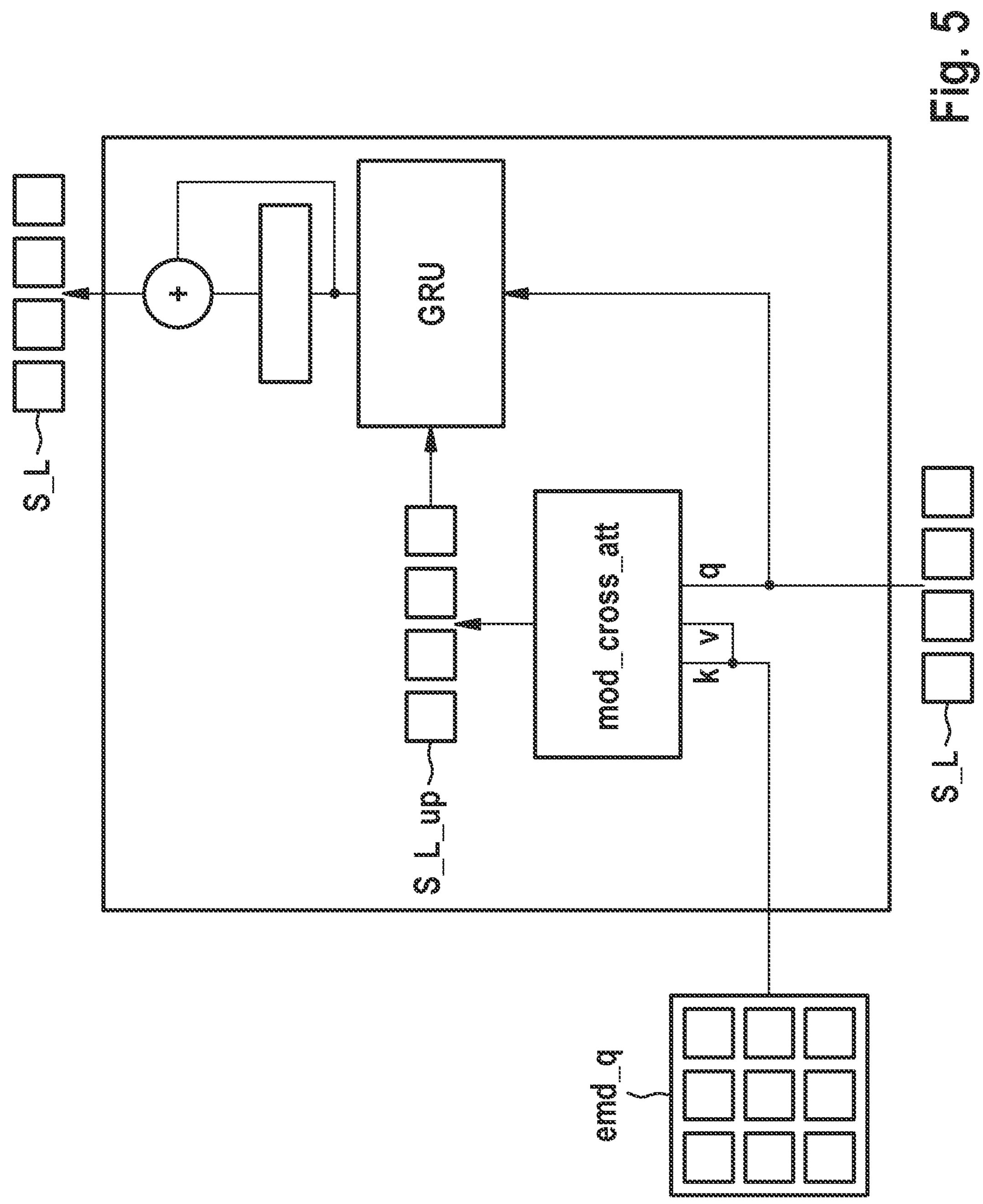
FIG. 5 schematically depicts a slot attention module of a second stage according to an example embodiment of the present invention.

The slot attention module is depicted in FIG. 5.

Figure 6A:
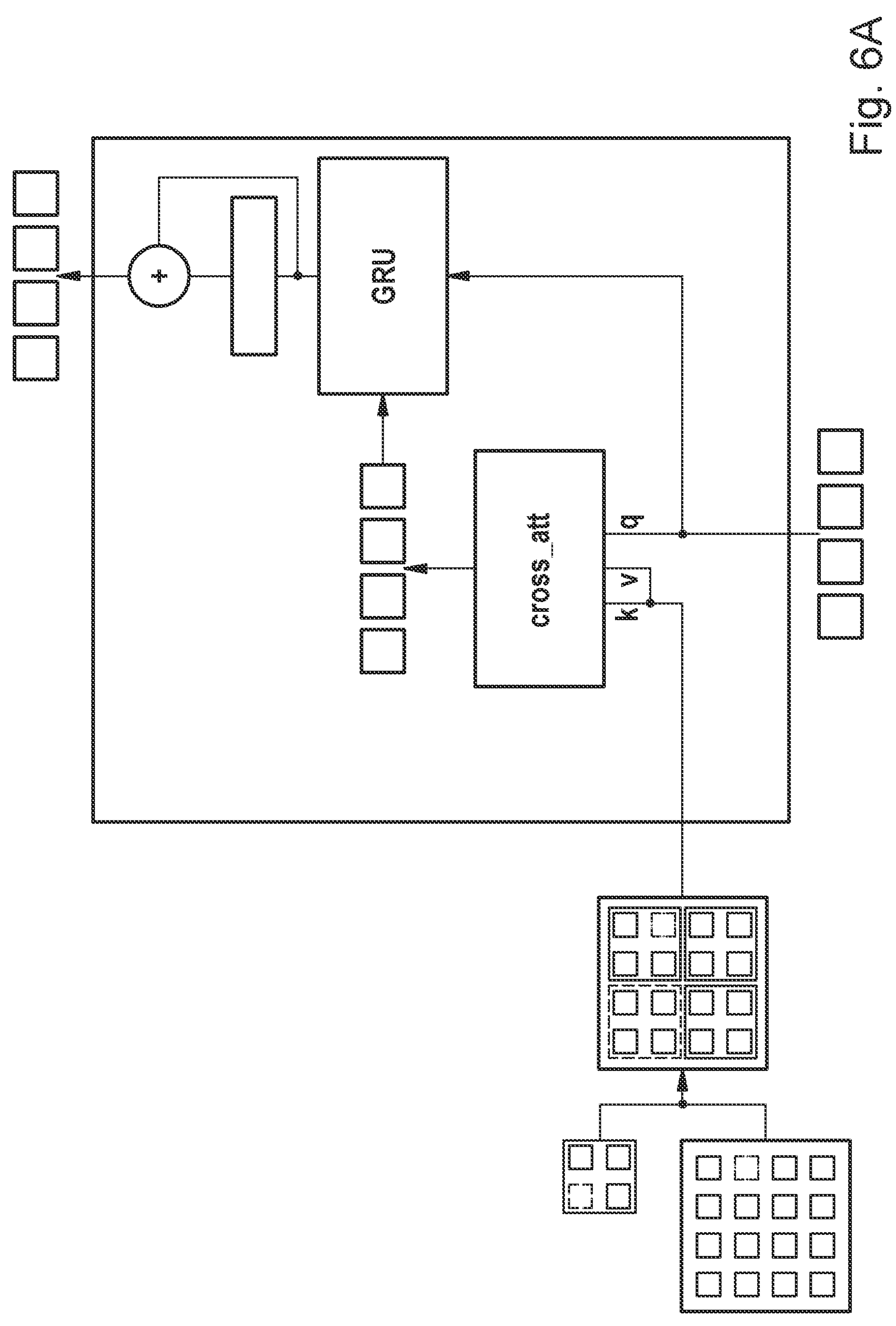
FIG. 6A-6C schematically depict different modifications of the slot attention module, according to example embodiments of the present invention.
Figure 6B:
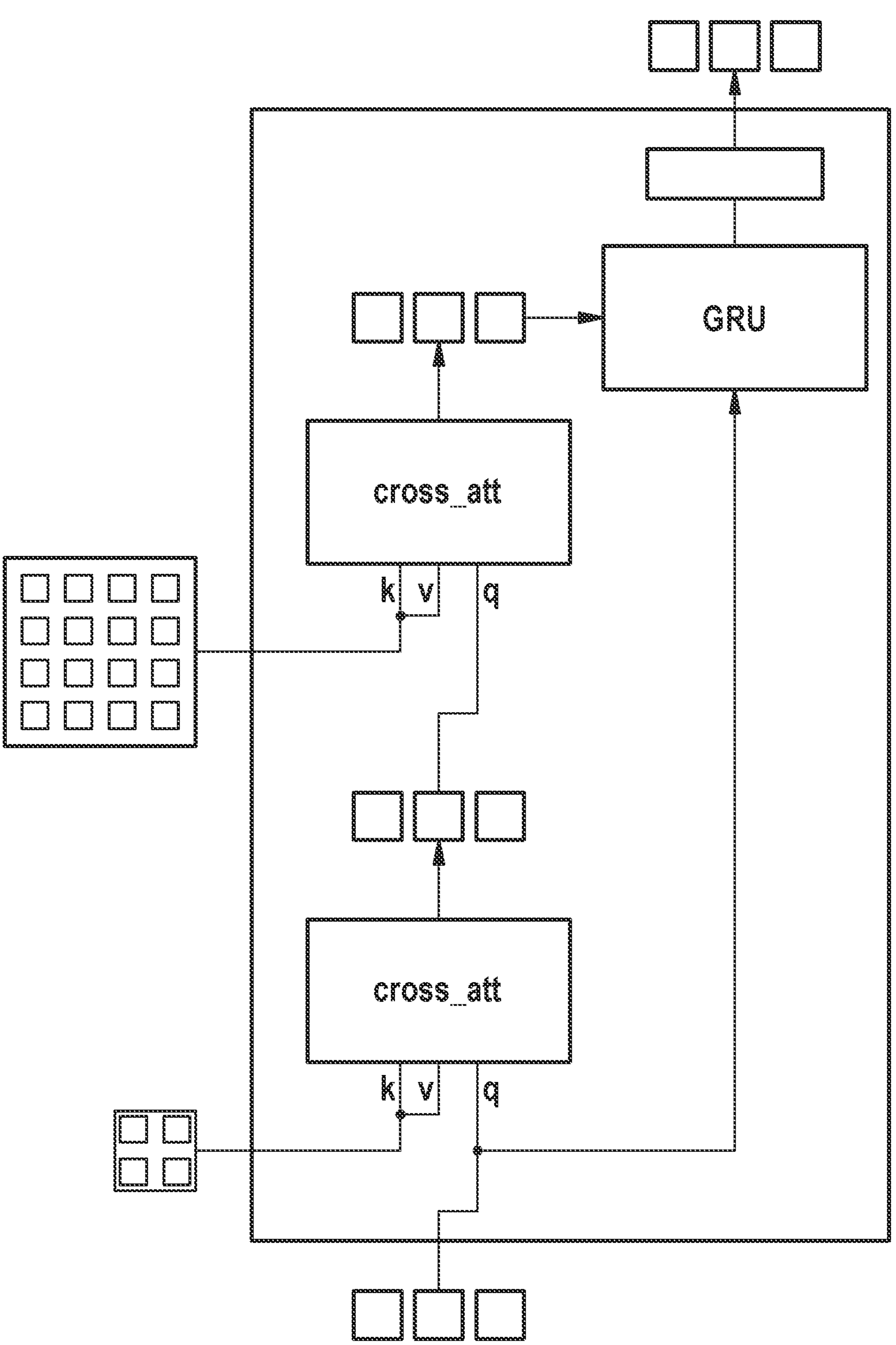
Figure 6C:
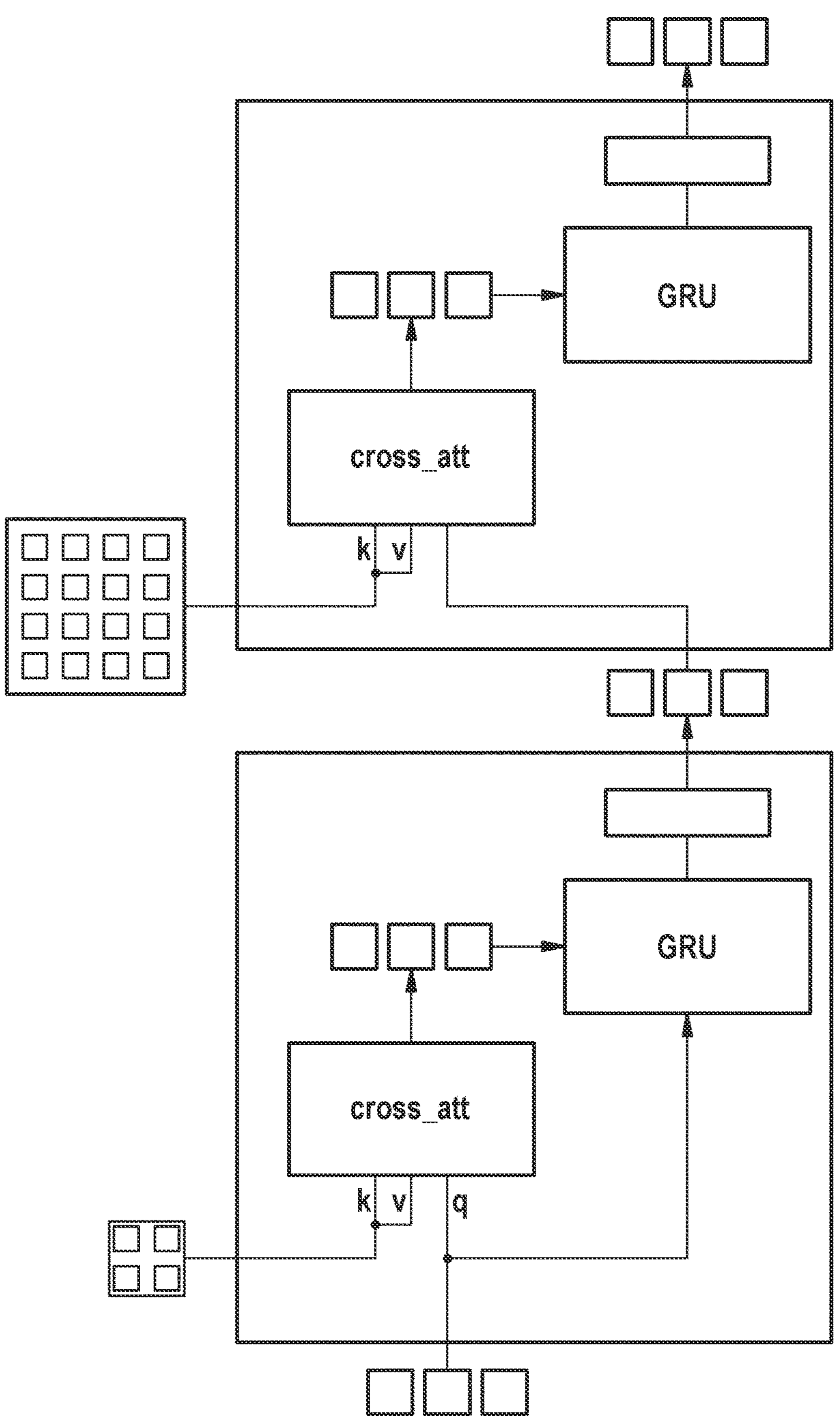

If multiple hierarchical codebooks related to multiple scales are obtained from stage 1, different modifications of the slot attention module are provided, see FIGS. 6A to 6C.

FIG. 6A refers to mixing the information by concatenating the codebook vectors. FIG. 6B refers to nesting the cross attentions before the GRUs. FIG. 6C refers to concatenating two separate slot attention modules.

The updated slots S_L_up, updated via a slot attention module according to FIG. 5 or FIGS. 6A to 6C, will then end up conditioning the transformer decoder in the task of predicting the masked tokens. At inference time, the labeled-slot representations learned during training are then used for the conditioning of transformer decoder, allowing to generate an arbitrary number of labeled objects, and compose images with extremely high controllability.

Further embodiment of the present disclosure refer to a machine learning system trained according to the method described according to the figures.

Further embodiment of the present disclosure refer to the use of a trained machine learning, wherein the machine learning system being trained to a method according to the embodiments for at least one of the following a) generating labeled objects and/or b) composing image data for augmented and/or synthetic data and/or c) generating image data for synthetic data in unseen compositions.

In terms of compositionality, labeled-slot conditioning setting makes the control over the generated images straightforward: images can be synthesized with a certain set of objects. Further, objects can be easily added and/or removed and/or replaced in the synthesized images, by simply changing the conditioning. In addition, the fact that the model gets better reusable concept representations, which are collected in these codebook vocabularies, drastically enhances compositional capabilities.

According to an embodiment, the model is trained on at least two separate datasets with different classes, to generate new samples that combine the at least two, i.e. generalizing to unseen compositions. For instance, a model can be trained on dataset A referring to street scenes with cars and bicycles of a specific country A, and on a dataset B referring to street scenes with cars only without bicycles of a further specific country B. A model trained according to the described method will to be able to generate new images of street scenes of country B with bicycles, by conditioning on class “country B street” and “bicycle”, even if the two labels never appeared together in the dataset.

Further embodiment refer to the a method using of a machine learning, wherein the machine learning system for generating at least one training data set and/or at least one test data set. The at least one training data set or the at least one test data set comprising labeled object data and/or labeled image data. The at least one training data set or the at least one test data set is used to train and/or to test a machine learning system. The generated labeled object data and/or generated labeled image data is used for image analysis.

What is claimed is:

1. A computer-implemented method for training a machine learning system, the machine learning system being trained for generating images in at least two stages, the method comprising the following steps:

in a first stage based on at least one input image, learning at least one codebook by tokenizing the at least one input image and reconstructing images through an autoencoding architecture; and in a second stage, training a transformer decoder to generate images based on the at least one codebook by reconstructing masked tokens of the reconstructed images;

wherein, in the first stage, a codebook dictionary is generated by generating codebook vocabulary by cross-scale mixing, the cross-scale mixing including mixing image features of the input image among different scales of the image features, the image features being encoded and decoded via the autoencoding architecture, and wherein the transformer decoder is trained to generate images based on labeled-slot conditioning;

wherein the labeled-slot conditioning includes providing a plurality of class labels, each of the class labels corresponding to a class of an object of an image to slots of a slot attention module of the transformer decoder.

2. The method according to claim 1, wherein the input image includes low-level image features and high-level images features, and the cross-scale mixing includes aggregating high-level image features and low-level images features together via at least one cross-attention module among low-level image features and high-level image features.

3. The method according to claim 1, wherein the cross-scale mixing includes at least one tokenization and reconstruction process at a first level of the autoencoding architecture and at least one tokenization and reconstruction process at a second level of the autoencoding architecture, and: (i) updating the first level of the autoencoding architecture with losses coming from the second level the autoencoding architecture, and/or (ii) updating the second level of the autoencoding architecture with losses coming from the first level the autoencoding architecture.

4. The method according to claim 1, wherein in the first stage at least one of the following codebook configurations is generated: a) at least two separate scale-related codebook dictionaries; or b) a low-level codebook and a high-level codebook, wherein the low-level codebook is dependent on the high-level codebook; or c) a single scale-mixed codebook.

5. The method according to claim 4, wherein when at least two hierarchical codebook dictionaries related to different scales are obtained in stage 1, the slot attention module is modified according to one of the following: (i) mixing the at least two codebook dictionaries by concatenating vectors of the at least two codebook dictionaries, (ii) nesting the cross attentions before at least one gated recurrent unit (GRU) of the transformer decoder, (iii) concatenating at least two separate slot attention modules.

6. The method according to claim 1, further comprising initializing the slots of the slot attention module in a class-dependent way, and providing a loss term that enforces a respective slot to be associated to specific class.

7. The method according to claim 1, wherein the machine learning system is trained on at least two different data sets.

8. A machine learning system trained for generating images in at least two stages, the machine learning system being trained by a method including the following steps:

in a first stage based on at least one input image, learning at least one codebook by tokenizing the at least one input image and reconstructing images through an autoencoding architecture; and in a second stage, training a transformer decoder to generate images based on the at least one codebook by reconstructing masked tokens of the reconstructed images;

wherein, in the first stage, a codebook dictionary is generated by generating codebook vocabulary by cross-scale mixing, the cross-scale mixing including mixing image features of the input image among different scales of the image features, the image features being encoded and decoded via the autoencoding architecture, and wherein the transformer decoder is trained to generate images based on labeled-slot conditioning;

wherein the labeled-slot conditioning includes providing a plurality of class labels, each of the class labels corresponding to a class of an object of an image to slots of a slot attention module of the transformer decoder.

9. The machine learning system according to claim 8, wherein the machine learning system is trained for at least one of the following: a) generating labeled objects, and/or b) composing image data for augmented and/or synthetic data, and/or c) generating image data for synthetic data in unseen compositions.

10. The machine learning system according to claim 9, wherein the machine learning system is trained for generating at least one training data set and/or at least one test data set, the at least one training data set and/or the at least one test data set including labeled object data and/or labeled image data, wherein the at least one training data set or the at least one test data set is used to train and/or to test a machine learning system.

* * * * *